Aug. 31, 1926.

S. W. NICHOLSON

WINDOW CONTROL MECHANISM

Filed May 9, 1921

1,598,102

Inventor
Stanley W. Nicholson

By Whittemore, Hulbert, Whittemore, and Belknap
Attorneys

Patented Aug. 31, 1926.

1,598,102

UNITED STATES PATENT OFFICE.

STANLEY W. NICHOLSON, OF TOLEDO, OHIO, ASSIGNOR TO THE DURA COMPANY, OF TOLEDO, OHIO, A CORPORATION OF DELAWARE.

WINDOW-CONTROL MECHANISM.

Application filed May 9, 1921. Serial No. 467,911.

This invention relates to window control mechanisms and more particularly to control mechanisms for sliding window members such as are commonly used on automobiles and other vehicles.

The invention consists in the structural features and arrangement of parts hereinafter fully described and illustrated in accompanying drawing wherein.

Figure 1:
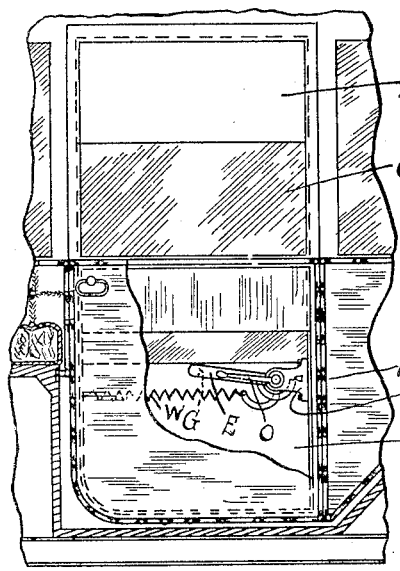
Figure 1 is an interior view of an automobile door provided with a window equipped with the improved control mechanism.
Figure 3:
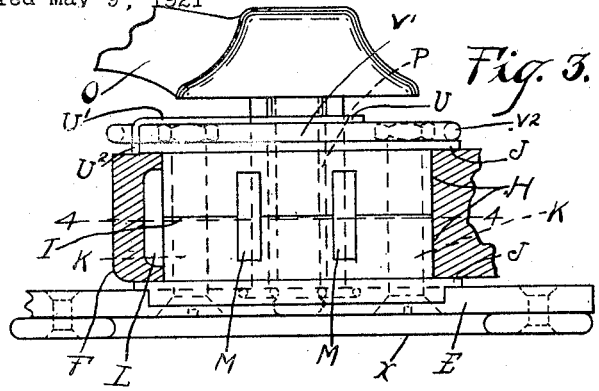
Figure 3 is a plan view of the mounting of the window control arm.
Figure 5:
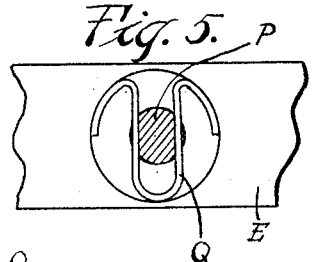
Figure 5 is a detail view of a retaining means for the pin carrying the control handle.
Figure 6:
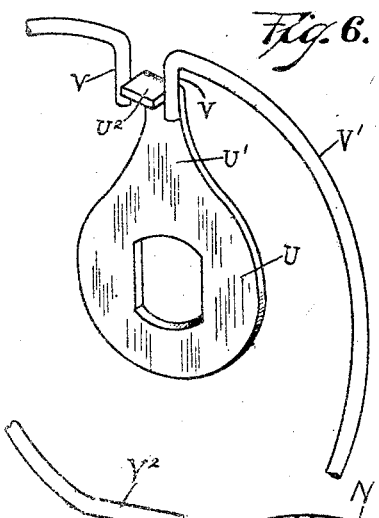
Figure 6 is a perspective view, showing the spring means for normally maintaining a neutral position of the actuating handle.
Figure 2:
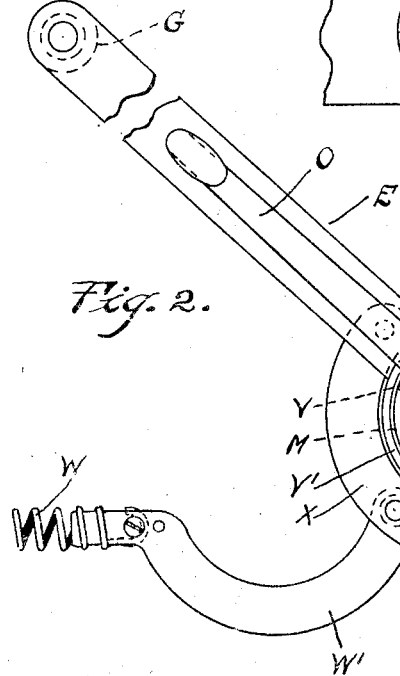
Figure 2 is a similar enlarged view of the control mechanism.
Figure 4:
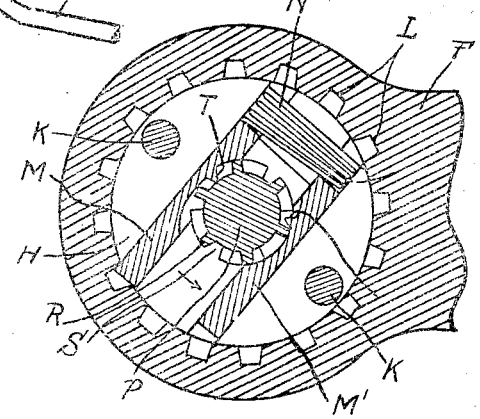
Figure 4 is a sectional view taken on line 4—4 of Figure 3.

In these views the reference character A designates an automobile door having in its upper portion a window opening B, and provided with a closure for said opening having the nature of a vertically slidable glass plate C adapted in its lowered or opened position to enter a chamber D formed in the lower portion of the door. Within said chamber a window control arm E is pivotally mounted at one end upon a bracket F secured to one of the side uprights of the door and at its other end carries a roller G engaging beneath the plate C. The pivot member for said control arm comprises complementary cylindrical members H abutting as indicated at I and formed upon the opposed ends of the pivot member with annular flanges J adapted to engage at opposite sides of the bracket F to prevent endwise movement of the pivot member. A pair of bolts K accomplish the double function of attaching the control arm to the pivot member and clamping the two complements H of said member in a unitary relation. The cylindrical face of the opening in the bracket F which receives said pivot member is formed with a uniformly spaced series of transverse notches L, and a pair of parallel sliding detent bars M and M' are jointly mounted in the members H at each side of the axis thereof to engage the notches L and thereby normally hold the pivot member and arm E stationary so as to maintain any position in which the window member C may be adjusted. A light coiled spring N is inserted in a cylindrical recess N' jointly formed in the parts H and forms a common means for urging the detent bars M into normal engagement with the notches L. O is an actuating handle for the arm E extending parallel to said arm and arranged at the opposite side of the bracket F from that to which the arm E is adjacent. Said handle is mounted fast upon one end of the pin P passing axially through the pivot member H, the other end of this pin being engaged by a spring clip Q (such as is best shown in Figure 5), said clip preventing any axial shifting of said pin from its proper position in the assembly. The pin P is formed with a plurality of uniformly spaced longitudinal teeth R adapted for lost motion engagement with teeth S formed upon the members H and projecting into the central opening of said members in which the pin P is engaged. Thus when the handle O is actuated there is initially a slight lost motion movement thereof such as to bring the teeth R of the pin P into engagement with the teeth S of the members H, such engagement communicating rotation from said pin to the pivot member upon further rotation of the handle O. Provision is made for utilizing the initial lost motion movement of the pin P to retract one or the other of the detent bars M and M' according to the direction in which the handle O is actuated, this provision consisting in two opposed teeth T respectively formed upon the detent bars M and engageable by adjacent teeth R of the pin P during the initial rotation thereof so as to effect retraction of that detent which would oppose a rotation of the pivot member H corresponding to the direction in which the handle O is being actuated. To normally maintain a neutral position of the handle member there is mounted fast upon the pin P, adjacent said handle member, a disk U having a portion U' projecting in the direction of the handle and terminating in a bent finger U² engaging between the inwardly bent ends V of a circular spring V' embracing the flange J of the adjacent member H and formed opposite to said bent ends V with a tangential portion V², and engaging a corresponding portion of the flange J and thus resisting rotation of said spring. The effect of said spring V' upon the pin P is to maintain the teeth R of said pin normally substantially midway between the teeth S of the pivot member so as to insure a certain lost motion travel of the pin in either direction of rotation before a driving engagement is established between the pin and pivot member. As shown in Figure 4 the pin P has been given its initial rotation in the direction of the arrow, the lost motion between said pin and pivot member having been taken up and the detent bar M' having been retracted during such lost motion movement so that the pivot member is free to be rotatively actuated by said pin upon a further turning of the handle in its initial direction.

Counterbalancing means for the sliding window member is provided as is customary, the illustrated means consisting in a coiled spring W secured within the chamber D to the door upright opposite to that upon which the bracket F is mounted, said spring being connected through an anchorage member W' to a semi-circular bar X mounted upon the pivotal end of the control arm E and partially embarcing the bearing portion of said bracket.

The described construction is adapted to be manufactured at a comparatively low expense and may be very quickly assembled. The use of a single spring to project both detent bars M, M' is a desirable feature of the construction as is also the employment of bar material to form said detents, requiring very litle machining. One of the most desirable features of the construction lies in the use of a very light spring to project the two detent bars, this feature securing the advantage that the clicking noise when the mechanism is operated is negligible. In the prior art where a detent or detents have been employed in a similar connection, the spring projecting the same has been also employed to maintain the neutral position of the actuating handle. Applicant employs a separate spring V' to maintain the handle in neutral position and is thereby enabled to use a very light spring for the detent bars. The elimination of clicking further follows from the use of a single spring N to project both detents for the reason that the withdrawal of either detent, preliminary to rotation of the pivot member, acts to considerably relieve the other detent from the stress of the spring N, since the latter is compressed by the retracted detent. The formation of the pivot member H in two parts respectively formed with flanges engaging opposite sides of the bracket F is a further improvement which the invention effects. The employment of the spring clip Q to retain the pin P against axial shifting reduces the cost of construction and facilitates assembly. The two-part pivot construction tends to exepdite assembly of the detents and the spring N in the pivot member.

What I claim as my invention is:

1. In combination, a stationary bearing, an arm, a two-part pivot member journaled in and extending transversely of said bearing, and means for clamping the parts of the pivot member in assembled relation and also securing said arm in fixed relation to the pivot member.

2. In combination, a bearing, and a pivot member journaled in said bearing, a pair of detent members carried by the pivot member and adapted to project into engagement with the bearing to reversely oppose rotation of the pivot member, a common spring for projecting said detents, an actuating member for said pivot member, and means for retracting one or other of said detents upon initial movement of said actuating member according to the direction of actuation thereof.

3. In combination, a bearing, and a pivot member journaled in said bearing, a pair of detents mounted in said pivot member and respectively engageable in a projected position with the bearing to reversely oppose rotation of the pivot member, a common spring for projecting said detents, an actuating member for the pivot member having a lost motion engagement therewith, and a spring acting upon the handle normally maintaining the neutral position thereof as regards its lost motion travel.

4. In combination, a bearing member, and a pivot member journaled therein, an actuating handle for said pivot member, a pin rigidly secured to said handle and axially engaging said pivot member, said pin being longitudinally toothed, corresponding teeth upon the pivot member adapted for lost motion engagement by the teeth of said pin, a pair of sliding detents mounted in the pivot member at each side of said pin and engageable in projected position with the bearing member to respectively reversely resist rotation of the pivot member, means yieldably urging said detents into engagement with the bearing member, projections upon the detents engageable by the teeth of said pin during the lost motion travel of said pin to retract one or the other of the detents according to the direction of actuation of the pin, and spring means to normally maintain a neutral position of the pin as regards its lost motion travel.

5. In combination, a bearing, and a pivot member journaled in said bearing, said member being formed of complementary parts having adjoining faces transverse to the pivotal axis, a latch member slidably mounted jointly in said complementary members and engageable with said bearing to exercise its latch function, and a clamping connection between said complementary members.

6. In combination, a pivot member, and a bearing therefor, an actuating handle for said member, a latch element slidably mounted in said pivot member and engageable with said bearing to exercise its latch function, a pin rigidly secured to said handle and axially engaging said pivot member, said pin having a direct lost-motion actuating connection with said latch member, means yieldably urging said latch member into engagement with said bearing, and spring means normally maintaining the neutral position of the pin as regards its lost motion travel.

In testimony whereof I affix my signature.

STANLEY W. NICHOLSON.